United States Patent
Kobayashi

(10) Patent No.: US 8,325,910 B2
(45) Date of Patent: Dec. 4, 2012

(54) ECHO CANCELLING DEVICE, COMMUNICATION DEVICE, AND ECHO CANCELLING METHOD HAVING THE ERROR SIGNAL GENERATING CIRCUIT

(75) Inventor: Hiroyuki Kobayashi, Kanagawa (JP)

(73) Assignee: Renesas Electronics Corporation, Kawasaki-Shi, Kanagawa (JP)

( * ) Notice: Subject to any disclaimer, the term of this patent is extended or adjusted under 35 U.S.C. 154(b) by 592 days.

(21) Appl. No.: 12/461,329

(22) Filed: Aug. 7, 2009

(65) Prior Publication Data
US 2010/0074434 A1    Mar. 25, 2010

(30) Foreign Application Priority Data
Sep. 24, 2008 (JP) ................. 2008-243702

(51) Int. Cl.
*H04M 9/08* (2006.01)
(52) U.S. Cl. .............. 379/406.08; 379/406.01
(58) Field of Classification Search ......... 379/3, 406.01, 379/406.08, 406.09
See application file for complete search history.

(56) References Cited

U.S. PATENT DOCUMENTS

| | | | |
|---|---|---|---|
| 7,856,097 B2 | 12/2010 | Tokuda | |
| 2004/0125944 A1* | 7/2004 | Popovic et al. | 379/406.01 |
| 2008/0112568 A1 | 5/2008 | Sakuraba | |
| 2008/0205633 A1* | 8/2008 | Dyba et al. | 379/406.08 |

FOREIGN PATENT DOCUMENTS

| | | |
|---|---|---|
| JP | 2002-076999 | 3/2002 |
| JP | 2003-249996 A | 9/2003 |
| JP | 2006-033802 A | 2/2006 |
| JP | 2007-053511 A | 3/2007 |
| JP | 2008-141734 | 6/2008 |

OTHER PUBLICATIONS

Japanese Office Action dated Sep. 10, 2012 with an English translation thereof.

* cited by examiner

*Primary Examiner* — Creighton Smith
(74) *Attorney, Agent, or Firm* — McGinn IP Law Group, PLLC

(57) ABSTRACT

Provided is an echo canceller capable of realizing an excellent echo cancellation performance even in a double talk state. An echo canceller (10) comprises: an adaptive filter (20); a subtractor (30); and an error signal generating circuit (40). The adaptive filter (20) synthesizes a spurious echo signal (y'(k)) from a receiving signal (x(k)) before being delivered from a speaker (3). The subtractor (30) subtracts the spurious echo signal (y'(k)) from an input signal (yin(k)) received by a microphone (2) so as to generate an echo cancellation signal (p(k)) The error signal generating circuit (40) generates an error signal (s(k−1)) by removing a spurious voice signal (r(k−1)) corresponding to a voice signal (v(k)) of a talker from the echo cancellation signal (p(k)). The adaptive filter (20) updates a characteristic of the adaptive filter (20) so that an amplitude of the error signal (s(k−1)) becomes smaller.

19 Claims, 5 Drawing Sheets

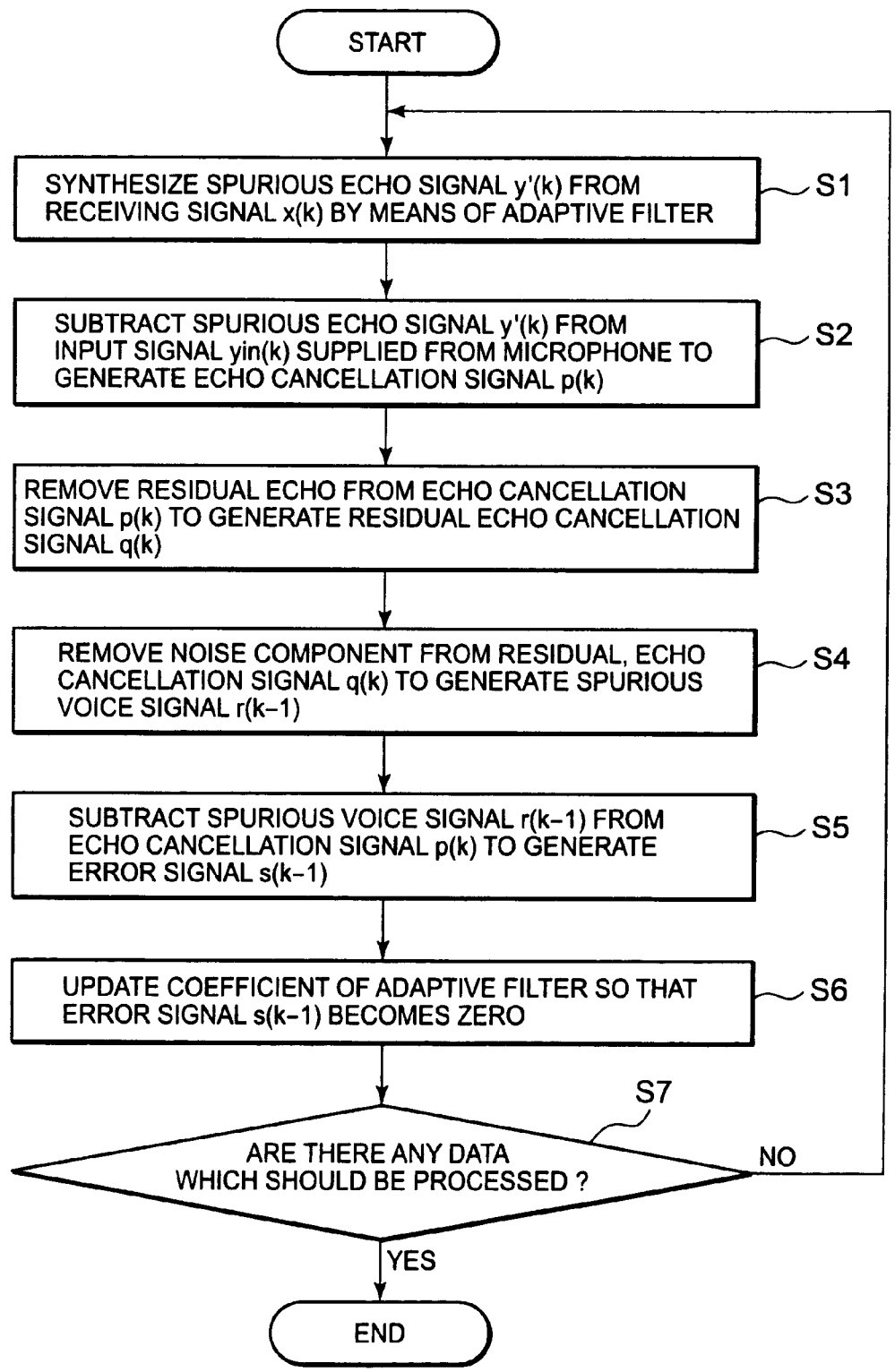

ECHO CANCELLING DEVICE, COMMUNICATION DEVICE, AND ECHO CANCELLING METHOD HAVING THE ERROR SIGNAL GENERATING CIRCUIT

BACKGROUND OF THE INVENTION

1. Field of the Invention

The present invention relates to an echo cancelling technology used in a communication device. In particular, the present invention relates to the echo cancelling technology in a double talk state.

2. Description of the Related Art

Recently, mobile phones having a videophone function have come on the market, and the number of users who talk in a hands free talk mode has increased upon using the videophone function. In the hands free talk mode, a sound output level from a speaker may be so high that a sound from the speaker may be received by a microphone. This phenomenon is called as "sneaking".

As illustrated in FIG. 1, when the sneaking occurs on a far end talker side, a phenomenon that a voice of a near end talker is heard from a speaker on a near end talker side after a while occurs (that is called an "echo"). Such an echo is a phenomenon unpleasant to the near end talker. In addition, as illustrated in FIG. 2, when the sneaking occurs on both the far end talker side and the near end talker side, an acoustic closed loop may be formed. As a loop gain increases, an oscillation may be generated so that a phenomenon of generating a large sound like "boom" (so-called "howling sound") will occur. The howling sound is also an unpleasant phenomenon, and the user on both ends will have no other choice but to stop talking. In order to suppress such an echo or a howling sound as described above, an echo canceller is used.

FIG. 3 illustrates a structure of the echo canceller described in "Technology of Digital Audio" written and edited by Nobuhiko Kitawaki, issued by the Telecommunications Association, distributed by Ohmsha, Ltd. ISBN4-88549-905-4. A signal transmitted from a mobile terminal on the near end talker side to a mobile terminal on the far end talker side is a transmitting signal e(k). On the contrary, a signal received by the mobile terminal on the near end talker side from the mobile terminal on the far end talker side is a receiving signal x(k). The receiving signal x(k) is delivered from a speaker of the mobile terminal on the near end talker side. In addition, it is supposed that the near end talker is performing a hands free talk. Therefore, an echo signal y(k) is generated by sneaking of the receiving signal x(k) delivered from the speaker, and is received by a microphone of the mobile terminal on the near end talker side. This echo signal y(k) is expressed by Equation (1).

$$y(k)=h(k)\times x(k) \quad \text{Equation (1)}$$

The parameter h(k) in Equation (1) is a conversion coefficient from the receiving signal x(k) into the echo signal y(k). In other words, the conversion coefficient h(k) indicates a transmission characteristic of an acoustic echo path from the speaker to the microphone, which depends on an environment in which the mobile terminal on the near end talker side is placed. In addition to the echo signal y(k) described above, a voice signal v(k) of the near end talker and an ambient noise signal n(k) are also received by the microphone of the mobile terminal on the near end talker side. In other words, an input signal yin(k) received by the microphone of the mobile terminal on the near end talker side is expressed by Equation (2).

$$yin(k)=v(k)+n(k)+y(k) \quad \text{Equation (2)}$$

Note that k indicates time as to the parameters described above. The same is true in the following description.

The echo canceller illustrated in FIG. 3 includes an adaptive filter and a subtractor so as to cancel the echo signal y(k). First, the adaptive filter synthesizes a spurious echo signal y'(k) from the receiving signal x(k) based on the NLMS algorithm. This spurious echo signal y'(k) is an echo signal estimated by the adaptive filter and is expressed by Equation (3).

$$y'(k)=h'(k)\times x(k) \quad \text{Equation (3)}$$

The parameter h'(k) in Equation (3) is a conversion coefficient from the receiving signal x(k) into the spurious echo signal y'(k). In other words, the conversion coefficient h'(k) indicates a transmission characteristic of the acoustic echo path from the speaker to the microphone, which is estimated by the adaptive filter. The adaptive filter delivers the obtained spurious echo signal y'(k) to the subtractor.

The subtractor receives the input signal yin(k) from the microphone. Then, the subtractor generates the transmitting signal e(k) by subtracting the above-mentioned spurious echo signal y'(k) from the received input signal yin(k). The transmitting signal e(k) generated by the subtractor is expressed by Equation (4).

$$e(k)=yin(k)-y'(k)=v(k)+n(k)+y(k)-y'(k) \quad \text{Equation (4)}$$

The adaptive filter illustrated in FIG. 3 performs feedback control based on the transmitting signal e(k). Specifically, the adaptive filter updates the above-mentioned conversion coefficient h'(k) so that the transmitting signal e(k) becomes zero. Here, it is supposed that the near end talker is not talking so that the voice signal v(k) of the near end talker is zero. In addition, it is supposed that a level of the ambient noise signal n(k) can be neglected. In this case, the transmitting signal e(k) generated by the subtractor is expressed by Equation (5).

$$e(k)=y(k)-y'(k) \quad \text{Equation (5)}$$

The adaptive filter updates the above-mentioned conversion coefficient h'(k) so that the transmitting signal e(k) expressed by Equation (5) becomes zero. In other words, the adaptive filter estimates the transmission characteristic h(k) of the acoustic echo path from the speaker to the microphone so that the echo signal y(k) received by the microphone is cancelled. The transmitting signal e(k) expressed by Equation (5) is an estimated error, and it can be said that the adaptive filter performs the feedback control so that the estimated error e(k) becomes zero. When the conversion coefficient h'(k) of the adaptive filter matches the transmission characteristic h(k) of the acoustic echo path, the spurious echo signal y'(k) agrees with the actual echo signal y(k), whereby echo cancellation is normally performed.

In this way, if the near end talker is not talking but only the far end talker is talking, the echo cancellation is normally performed. Actually, however, there often occurs the situation in which not only the far end talker but also the near end talker is talking simultaneously (hereinafter referred to as "double talk state"). In the double talk state, the transmitting signal e(k) generated by the subtractor is expressed by Equation (4). Even if the ambient noise signal n(k) can be neglected, the voice signal v(k) of the near end talker cannot be neglected. In this case, the adaptive filter performs the feedback control so that the transmitting signal e(k) expressed by Equation (4) becomes zero, and hence it is impossible to remove only the echo signal y(k) normally. In other words, the adaptive filter misestimates the transmission characteristic h(k) due to a disturbance other than the echo signal y(k) received by the microphone, with the result that the performance of the echo cancellation is deteriorated significantly.

As described above, the echo canceller illustrated in FIG. 3 becomes unstable with respect to a disturbance, and particularly in the double talk state, the performance of the echo cancellation is deteriorated significantly. A related technology for a purpose of solving the above-mentioned problem is described in Japanese Patent Application Laid-open No. 2002-76999.

FIG. 4 illustrates a structure of the echo canceller described in Japanese Patent Application Laid-open No. 2002-76999. The echo canceller illustrated in FIG. 4 includes a power estimation circuit 103, a step size decision circuit 104, a noise level estimation circuit 106, and a near end voice level estimation circuit 107 in addition to an adaptive filter 101 and a subtractor 102.

Similarly to the case of FIG. 3, the adaptive filter 101 synthesizes the spurious echo signal y'(k) from the receiving signal x(k), and the subtractor 102 subtracts the spurious echo signal y'(k) from the input signal yin(k) so as to generate the transmitting signal e(k). The transmitting signal e(k) is the same as that expressed by Equation (4). On the other hand, the power estimation circuit 103 estimates power of the receiving signal x(k) based on the receiving signal x(k) from the far end talker. In addition, the noise level estimation circuit 106 and the near end voice level estimation circuit 107 respectively estimate levels of the ambient noise signal n(k) and the voice signal v(k) based on the transmitting signal e(k).

The step size decision circuit 104 decides a step size based on the estimated power of the receiving signal x(k), the estimated level of the ambient noise signal n(k) and the estimated level of the voice signal v(k). The step size means an update quantity of the conversion coefficient h'(k) in the adaptive filter 101. For instance, when the estimated level of the voice signal v(k) or the ambient noise signal n(k) is relatively small, i.e., when it is determined that the input signal yin(k) received by the microphone is mainly the echo signal y(k), the step size decision circuit 104 sets the step size to be relatively large. On the other hand, when the estimated level of the voice signal v(k) or the ambient noise signal n(k) is relatively large, i.e., when it is determined that the disturbance received by the microphone is large, the step size decision circuit 104 sets the step size to be relatively small. The step size (update quantity) decided in this way is supplied to the adaptive filter 101 together with the transmitting signal e(k).

The adaptive filter 101 updates the conversion coefficient h'(k) so that the transmitting signal e(k) becomes zero. On this occasion, the adaptive filter 101 updates the conversion coefficient h'(k) in accordance with the step size decided by the step size decision circuit 104. In other words, when the estimated level of the voice signal v(k) or the ambient noise signal n(k) is relatively small, the adaptive filter 101 updates the conversion coefficient h'(k) by the large step. On the other hand, when the estimated level of the voice signal v(k) or the ambient noise signal n(k) is relatively large, the adaptive filter 101 updates the conversion coefficient h'(k) by the small step.

In this way, the echo canceller illustrated in FIG. 4 estimates the level of the voice signal v(k) and the ambient noise signal n(k) which are contained in the input signal yin(k), and sets the update quantity of the conversion coefficient h'(k) to be variable in accordance with the situation. Thus, it is possible to suppress the transmission characteristic h(k) from being largely misestimated by the adaptive filter 101, whereby the stability with respect to the disturbance is improved. In other words, it is possible to suppress the echo cancellation performance from being significantly deteriorated.

Japanese Patent Application Laid-open No. 2008-141734 discloses an echo canceller that is used for a loudspeaker call system for performing a loudspeaker call using a speaker and a microphone. The echo canceller includes an adaptive filter portion and an echo suppressing portion. The adaptive filter portion identifies an impulse response of a feedback path constituted of an acoustic connection between the speaker and the microphone, in an adaptive manner, and estimates an echo component of the feedback path based on an input signal supplied to the feedback path. Further, the adaptive filter portion subtracts the estimated echo component from a microphone input signal supplied from the feedback path. The echo suppressing portion performs an echo suppressing process on an echo cancellation output signal delivered from the adaptive filter portion. Specifically, the echo suppressing portion determines an echo suppressing quantity based on a Wiener filtering method by using an echo reducing quantity that is defined based on a ratio between the above-mentioned microphone input signal and a voice signal on the near end side which mixes in the feedback path. Then, the echo suppressing portion multiplies the echo suppressing quantity and the echo cancellation output signal delivered from the adaptive filter portion together.

In the echo canceller illustrated in FIG. 4, the step size is decided based on three parameters including the estimated power of the receiving signal x(k), the estimated level of the ambient noise signal n(k), and the estimated level of the voice signal v(k). However, it is difficult to decide an appropriate step size by such a method as described above. It is because that the power of the receiving signal x(k), the levels of the ambient noise signal n(k), and the voice signal v(k) vary largely in accordance with a telephone environment.

SUMMARY

According to a first aspect of the present invention, an echo cancelling device is provided. The echo cancelling device comprises: an adaptive filter; a subtractor; and an error signal generating circuit. The adaptive filter synthesizes a spurious echo signal from a receiving signal before being delivered from a speaker. The subtractor subtracts the spurious echo signal from an input signal received by a microphone so as to generate an echo cancellation signal. The error signal generating circuit generates an error signal by removing a spurious voice signal corresponding to a voice signal of a talker from the echo cancellation signal. The adaptive filter updates a characteristic of the adaptive filter so that an amplitude of the error signal becomes smaller.

According to a second aspect of the present invention, a communication device is provided. The communication device comprises: a microphone which receives an input signal; a speaker which delivers a receiving signal; and an echo cancelling device. The echo cancelling device includes: an adaptive filter which synthesizes a spurious echo signal from the receiving signal before being delivered from the speaker; a subtractor which subtracts the spurious echo signal from the input signal so as to generate an echo cancellation signal; and an error signal generating circuit which generates an error signal by removing a spurious voice signal corresponding to a voice signal of a talker from the echo cancellation signal. The adaptive filter updates a characteristic of the adaptive filter so that an amplitude of the error signal becomes smaller.

According to a third aspect of the present invention, an echo cancelling method is provided. The echo cancelling method comprises: (A) synthesizing, by means of an adaptive filter, a spurious echo signal from a receiving signal before being delivered from a speaker; (B) subtracting the spurious echo signal from an input signal received by a microphone so as to generate an echo cancellation signal; (C) generating an error signal by removing a spurious voice signal corresponding to a voice signal of a talker from the echo cancellation signal; and (D) updating a characteristic of the adaptive filter so that an amplitude of the error signal becomes smaller.

According to the echo cancelling technology of the present invention, stability of the adaptive filter is enhanced with respect to disturbances except for the echo signal received by the microphone. As a result, an excellent echo cancellation performance can be obtained in a double talk state as well.

BRIEF DESCRIPTION OF THE DRAWINGS

In the accompanying drawings:

FIG. 7 is a flowchart illustrating an operation of the echo canceller according to the embodiment of the present invention.

DETAILED DESCRIPTION OF THE PREFERRED EMBODIMENT

Now, with reference to the attached drawings, an echo cancelling technology according to an embodiment of the present invention is described. The echo cancelling technology according to this embodiment can be applied to a communication device such as a mobile phone, a mobile terminal, a fixed telephone, a communication conference terminal, or the like.

1. Structures

Figure 5:
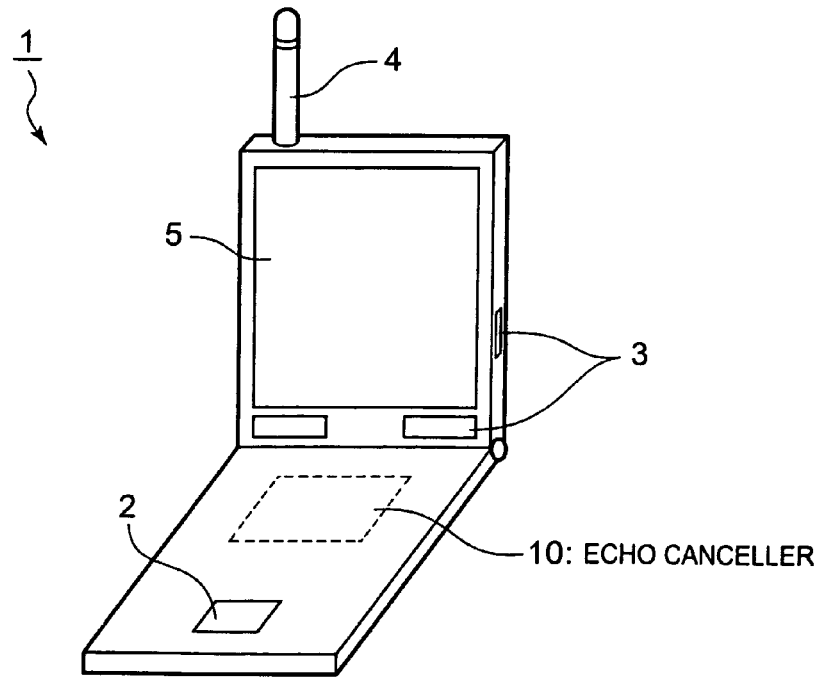
FIG. 5 is a schematic diagram illustrating a structure of a mobile terminal according to an embodiment of the present invention.

FIG. 5 schematically illustrates a mobile terminal 1 as an example of the communication device to which the echo cancelling technology of this embodiment is applied. The mobile terminal 1 includes a microphone 2 (input portion), a speaker 3 (output portion), an antenna 4, and a display 5. The mobile terminal 1 receives speech data from another mobile terminal via the antenna 4 and transmits speech data to the another mobile terminal. The mobile terminal 1 illustrated in FIG. 5 has a videophone function, for example, and a user (near end talker) can perform hands free talk by using the mobile terminal 1. In the hands free talk mode, the display 5 displays an image of a far end talker and the like, and the speaker 3 delivers a voice of the far end talker. A voice of the near end talker, ambient noise, an echo, and the like are received by the microphone 2.

Figure 6:
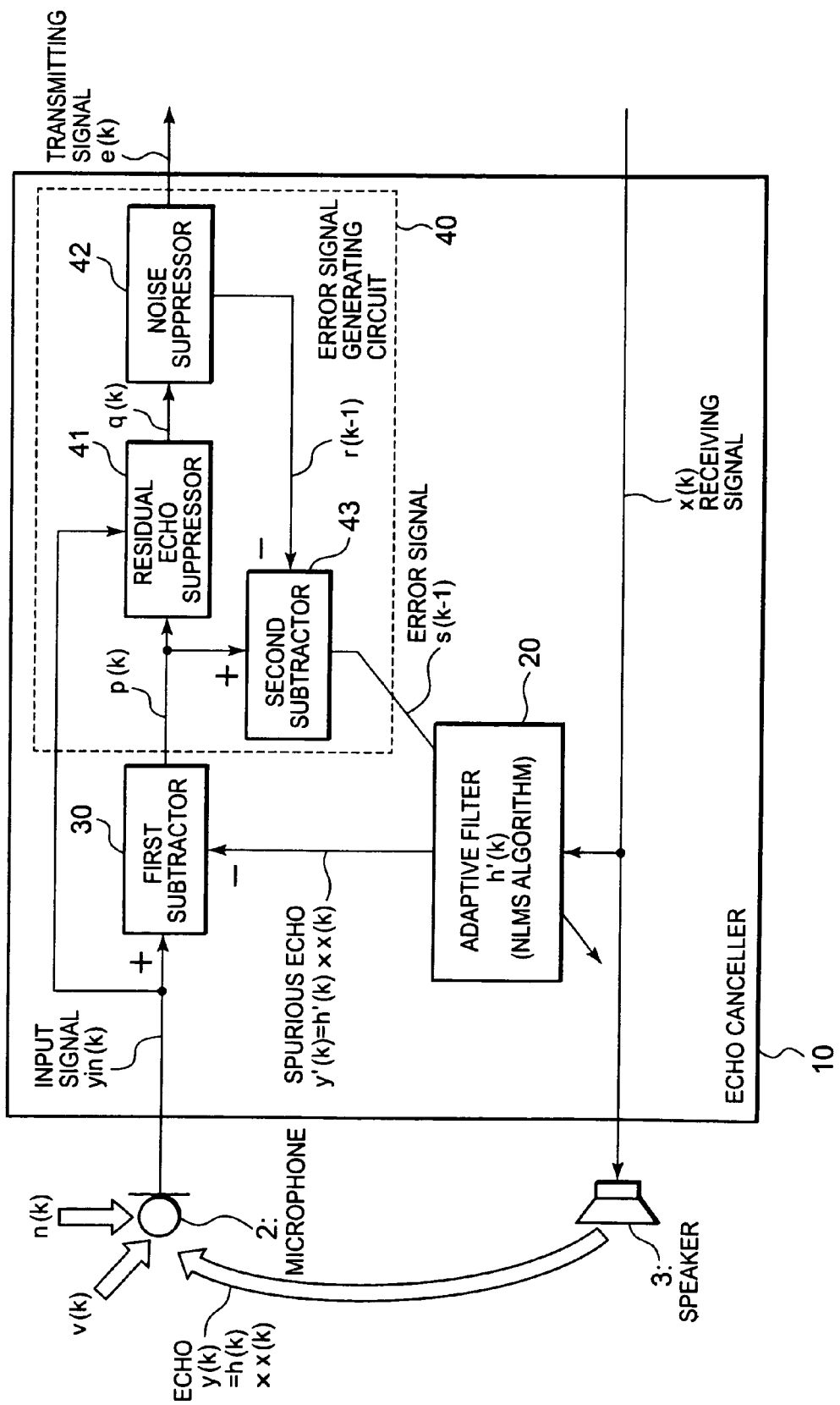
FIG. 6 is a block diagram illustrating a structure of an echo canceller (echo cancelling device) according to the embodiment of the present invention.

The mobile terminal 1 of this embodiment is further equipped with an echo canceller (echo cancelling device) 10. FIG. 6 is a block diagram illustrating a structure of the echo canceller 10 according to this embodiment. The echo canceller 10 of this embodiment includes an adaptive filter 20, a first subtractor 30, and an error signal generating circuit 40. The error signal generating circuit 40 includes a residual echo suppressor 41, a noise suppressor 42, and a second subtractor 43.

A signal transmitted from the mobile terminal 1 via the antenna 4 to the mobile terminal on the far end talker side is a transmitting signal e(k). On the other hand, a signal received by the mobile terminal 1 via the antenna 4 from the mobile terminal on the far end talker side is a receiving signal x(k). The receiving signal x(k) is delivered from the speaker 3 of the mobile terminal 1. In addition, it is supposed that the near end talker is performing the hands free talk. Therefore, an echo signal y(k) generated by sneaking of the receiving signal x(k) delivered from the speaker 3 is received by the microphone 2 of the mobile terminal 1. This echo signal y(k) is expressed by Equation (6).

$$y(k)=h(k)\times x(k) \quad \text{Equation (6)}$$

The parameter h(k) in Equation (6) is a conversion coefficient from the receiving signal x(k) to the echo signal y(k). In other words, the conversion coefficient h(k) indicates a transmission characteristic of an acoustic echo path from the speaker 3 to the microphone 2, which depends on an environment in which the mobile terminal 1 is placed. In addition to the above-mentioned echo signal y(k), a voice signal v(k) of the near end talker and an ambient noise signal n(k) are also received by the microphone 2 of the mobile terminal 1. In other words, an input signal yin(k) received by the microphone 2 of the mobile terminal 1 is expressed by Equation (7).

$$yin(k)=v(k)+n(k)+y(k) \quad \text{Equation (7)}$$

Note that k denotes time as to the parameters described above. The same is true in the following description.

2. Operations

FIG. 7 is a flowchart illustrating an operation of the echo canceller 10 according to this embodiment. Hereinafter, with reference to FIGS. 6 and 7, the operation of the echo canceller 10 according to this embodiment is described in detail.

(Step S1)

First, the adaptive filter 20 synthesizes a spurious echo signal y'(k) based on the NLMS algorithm from the receiving signal x(k) before being delivered from the speaker 3. This spurious echo signal y'(k) is an echo signal estimated by the adaptive filter 20 and is expressed by Equation (8).

$$y'(k)=h'(k)\times x(k) \quad \text{Equation (8)}$$

The parameter h'(k) in Equation (8) is a conversion coefficient from the receiving signal x(k) to the spurious echo signal y'(k). In other words, the conversion coefficient h'(k) indicates a transmission characteristic of the acoustic echo path from the speaker 3 to the microphone 2, which is estimated by the adaptive filter 20. The adaptive filter 20 delivers the obtained spurious echo signal y'(k) to the first subtractor 30.

(Step S2)

The first subtractor 30 receives the input signal yin(k) that is supplied from the microphone 2. Then, the first subtractor 30 subtracts the above-mentioned spurious echo signal y'(k) from the received input signal yin(k) so as to generate an echo cancellation signal p(k). The echo cancellation signal p(k) generated by the first subtractor 30 is expressed by Equation (9)

$$p(k) = yin(k) - y'(k)$$
$$= v(k) + n(k) + (y(k) - y'(k))$$

Equation (9)

The parameter "y(k)−y'(k)" in Equation (9) indicates an error of echo estimation performed in the adaptive filter 20 and is referred to as a "residual echo signal" in the following description.

(Step S3)

The residual echo suppressor 41 receives the echo cancellation signal p(k) generated by the first subtractor 30 and the input signal yin(k) supplied from the microphone 2. Then, the residual echo suppressor 41 removes the residual echo signal "y(k)−y'(k)" from the echo cancellation signal p(k), so as to generate a residual echo cancellation signal q(k). The removal of the residual echo signal "y(k)−y'(k)" can be performed by using the method described in Japanese Patent Application Laid-open No. 2008-141734. The residual echo cancellation signal q(k) generated by the residual echo suppressor 41 is expressed by Equation (10).

$$q(k) = p(k) - (y(k) - y'(k))$$
$$= v(k) + n(k)$$

Equation (10)

(Step S4)

The noise suppressor 42 receives the residual echo cancellation signal q(k) generated by the residual echo suppressor 41. Then, the noise suppressor 42 removes a noise signal that is equal to the ambient noise signal n(k) from the residual echo cancellation signal q(k). As the noise suppressor 42 of this embodiment, it is possible to use the one described in the paper: "Noise Suppression with High Speech Quality Based on Weighted Noise Estimation and MMSE STSA", KATO Masanori, SUGIYAMA Akihiko, SERIZAWA Masahiro, Institute of Electronics, Information and Communication Engineers, Papers VOL. J87-A, No. 7, pp. 851-860, July 2004.

As described in the above-mentioned paper, the noise suppressor 42 according to this embodiment removes a noise component based on the weighted noise estimation and the MMSE STSA method. More specifically, the noise suppressor 42 uses a degraded voice weighted in accordance with an estimated value of a voice-to-noise ratio so as to update a noise estimated value continuously. The noise estimated value is stored in a predetermined storage unit. Then, the noise suppressor 42 subtracts a noise estimated value n'(k−1) that is equal to the ambient noise signal n(k) from a residual echo cancellation signal q(k−1) of the previous sampling period so as to generate a spurious voice signal r(k−1) expressed by Equation (11).

$$r(k-1) = q(k-1) - n'(k-1)$$
$$= v(k-1) + n(k-1) - n'(k-1)$$

Equation (11)

As described above, the spurious echo signal y'(k) is removed in Step S2, the residual echo signal "y(k)−y'(k)" is removed in Step S3, and the noise component is removed in Step S4. Therefore, the signal r(k−1) generated by the noise suppressor 42 is the spurious voice signal corresponding to the voice signal v(k) of the near end talker. In other words, the noise suppressor 42 removes the noise component from the residual echo cancellation signal q(k) so as to extract the spurious voice signal r(k−1). The noise suppressor 42 delivers the obtained spurious voice signal r(k−1) as a transmitting signal e(k−1). The transmitting signal e(k−1) becomes the spurious voice signal r(k−1) that is almost the same as the voice signal v(k−1), and hence speech quality can be improved. Further, the noise suppressor 42 delivers the obtained spurious voice signal r(k−1) to the second subtractor 43.

(Step S5)

The second subtractor 43 receives the echo cancellation signal p(k) generated by the first subtractor 30. In addition, the second subtractor 43 receives the spurious voice signal r(k−1) generated by the noise suppressor 42. Then, the second subtractor 43 subtracts the spurious voice signal r(k−1) from the echo cancellation signal p(k) so as to generate a signal s(k−1) expressed by Equation (12).

$$s(k-1) = p(k) - r(k-1)$$
$$= (v(k) - r(k-1)) + n(k) + (y(k) - y'(k))$$

Equation (12)

In this embodiment, it is supposed that the ambient noise signal n(k) has a level that can be neglected. In addition, as described above, the spurious voice signal r(k−1) has a level corresponding to the voice signal v(k) of the near end talker. Therefore, it can be said that the signal s(k−1) generated by the second subtractor 43 indicates a level of the residual echo "y(k)−y'(k)" as a result of the echo cancellation process. In other words, the signal s(k−1) indicates the error of echo estimation in the adaptive filter 20. In this sense, the signal s(k−1) generated by the second subtractor 43 is referred to as an "error signal" in the following description.

The residual echo suppressor 41, the noise suppressor 42 and the second subtractor 43 described above constitute the error signal generating circuit 40 for generating the error signal s(k−1). The error signal generating circuit 40 removes the spurious voice signal r(k−1) corresponding to the voice signal v(k) of the talker from the echo cancellation signal p(k) so as to generate the error signal s(k−1). Then, the error signal s(k−1) generated by the error signal generating circuit 40 is delivered to the adaptive filter 20. In other words, according to this embodiment, not the transmitting signal but the error signal s(k−1) is fed back to the adaptive filter 20.

(Step S6)

The adaptive filter 20 receives the error signal s(k−1) and updates its characteristic so that an amplitude of the error signal s(k−1) becomes smaller. In other words, the adaptive filter 20 updates the conversion coefficient h'(k) so that the error signal s(k−1) becomes as small as possible. This process corresponds to the process of estimating the transmission characteristic h(k) of the acoustic echo path from the speaker 3 to the microphone 2 so that the echo signal y(k) received by the microphone 2 is cancelled. As described above, the error signal s(k−1) indicates an error in the estimation process, and it can be said that the adaptive filter 20 performs the feedback control so that the estimated error s(k−1) becomes zero. When the conversion coefficient h'(k) of the adaptive filter 20 matches the transmission characteristic h(k) of the acoustic echo path, the spurious echo signal y'(k) becomes equal to the actual echo signal y(k) so that the echo can be completely cancelled.

(Step S7)

Steps S1 to S6 described above are repeated until the process for the data is finished.

3. Effects

As described above, according to this embodiment, the adaptive filter 20 performs the feedback control based on the error signal s(k−1). The error signal s(k−1) does not contain a component corresponding to the voice signal v(k). It is because that the error signal generating circuit 40 removes the spurious voice signal r(k−1) corresponding to the voice signal v(k) from the echo cancellation signal p(k) so as to generate the error signal s(k−1).

The component corresponding to the voice signal v(k) is eliminated from the error signal s(k−1), and hence stability with respect to the disturbance is enhanced in the adaptive filter 20 that performs the feedback control based on the error signal s(k−1). In other words, it is possible to prevent the update of the characteristic of the adaptive filter 20 (conversion coefficient h'(k)) from being unstable also in the double talk state in which the voice signal v(k) is received. In other words, also in the double talk state, the performance of the echo canceller 10 is not lowered, whereby a good echo cancellation performance can be realized.

Figure 1:
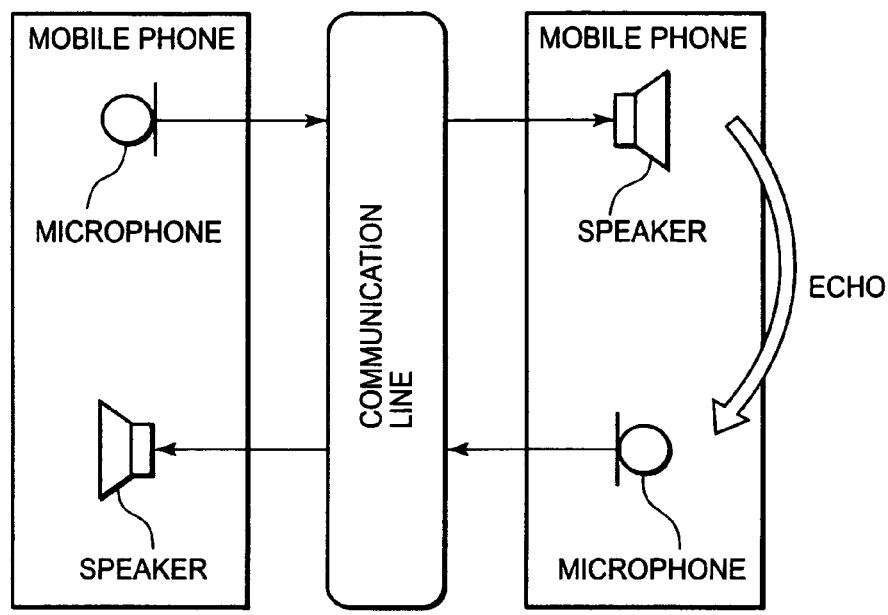
FIG. 1 is a conceptual diagram illustrating a principle of generation of an echo.
Figure 2:
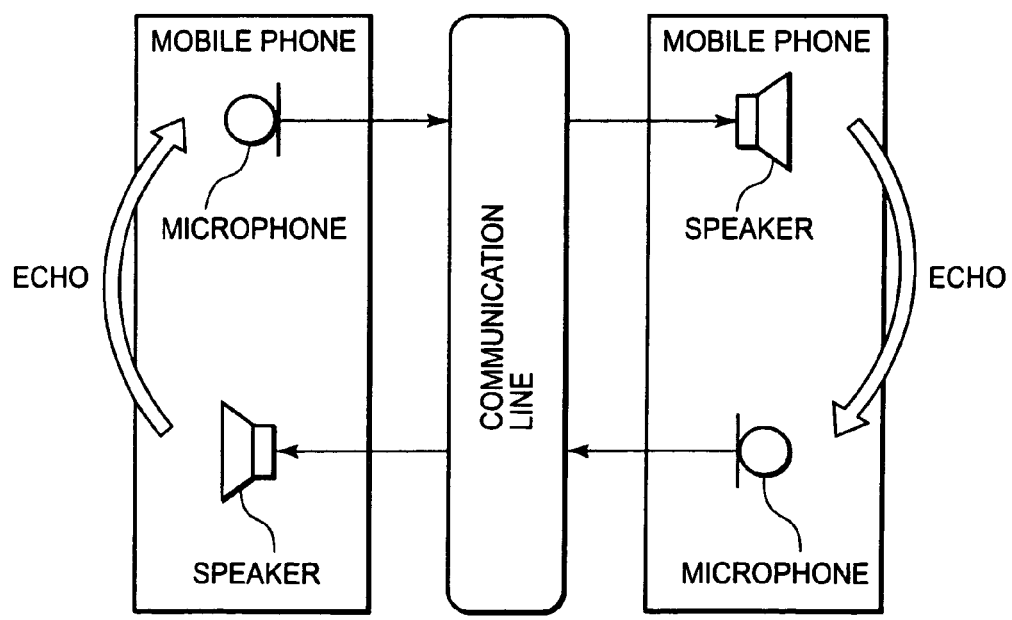
FIG. 2 is a conceptual diagram illustrating a howling sound.
Figure 3:
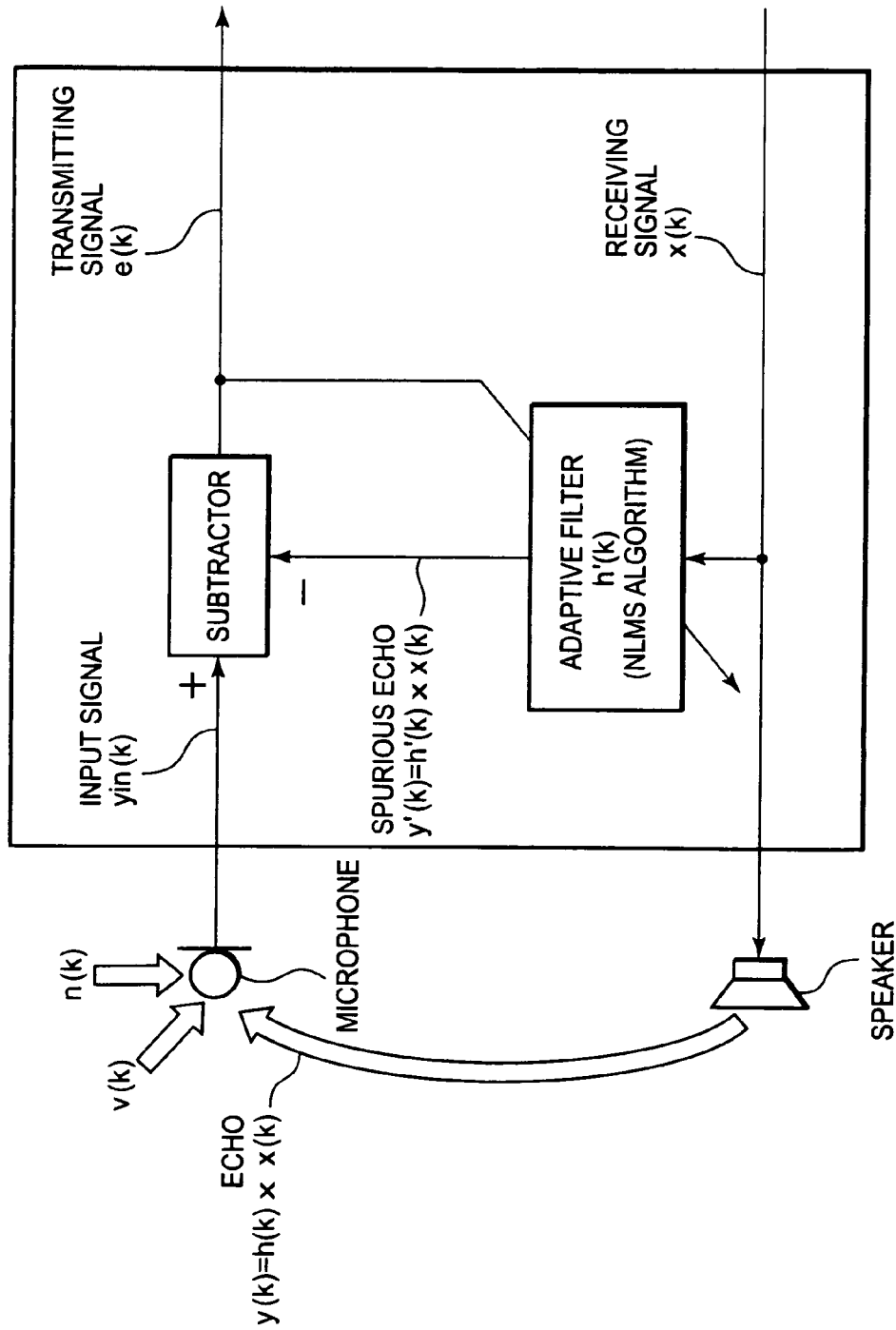
FIG. 3 is a block diagram illustrating a structure of an echo canceller according to a related technology.
Figure 4:
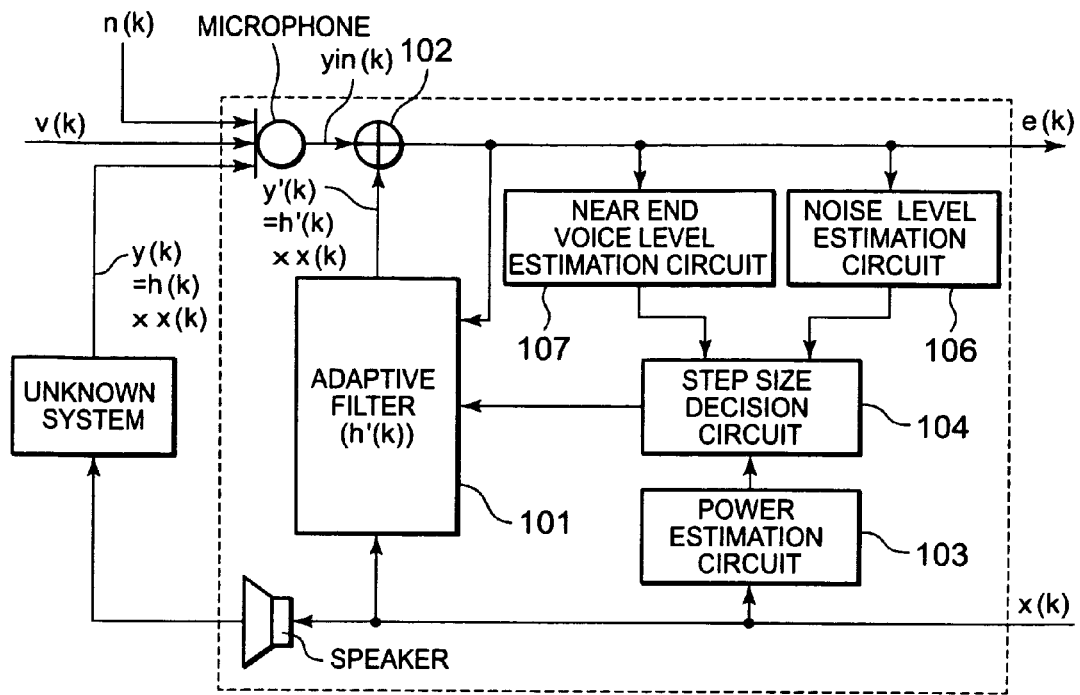
FIG. 4 is a block diagram illustrating a structure of an echo canceller according to another related technology.

In addition, unlike the echo canceller illustrated in FIG. 4, it is not necessary to determine the step size based on three parameters including the estimated power of the receiving signal x(k), the estimated level of the ambient noise signal n(k), and the estimated level of the voice signal v(k). It is possible to realize a good echo cancellation performance with a simple structure.

In this way, the embodiment of the present invention has been described with reference to the attached drawings.

It is apparent that the present invention is no limited to the above embodiments, but may be modified and changed without departing from the scope and spirit of the invention.

What is claimed is:

1. An echo cancelling device, comprising:
an adaptive filter which synthesizes a spurious echo signal from a receiving signal;
a first subtractor which generates an echo cancellation signal based on said receiving signal including a voice signal of a speaker and the spurious echo signal; and
an error signal generating circuit which generates an error signal based on an input signal and said echo cancellation signal.

2. An echo cancelling device according to claim 1, wherein said error signal generating circuit includes:
a residual echo suppressor which generates a residual echo cancellation signal by removing a difference between said echo signal and said spurious echo signal from said echo cancellation signal;
a noise suppressor which generates the spurious voice signal based on the residual echo cancellation signal; and
a second subtractor which generates the error signal by subtracting the spurious voice signal from said echo cancellation signal.

3. A communication device, comprising:
a microphone which receives an input signal;
a speaker which delivers a receiving signal; and
an echo cancelling device that includes:
an adaptive filter which synthesizes a spurious echo signal from said receiving signal;
a first subtractor which generates an echo cancellation signal based on said receiving signal including a voice signal of the speaker and the spurious echo signal; and
an error signal generating circuit which generates an error signal based on the input signal and said echo cancellation signal.

4. A communication device according to claim 3, wherein the error signal generating circuit includes:
a residual echo suppressor which generates a residual echo cancellation signal by removing a difference between the echo signal and the spurious echo signal from said echo cancellation signal;
a noise suppressor which generates the spurious voice signal based on the residual echo cancellation signal; and
a second subtractor which generates the error signal by subtracting the spurious voice signal from said echo cancellation signal.

5. An echo cancelling method, comprising:
synthesizing, by an adaptive filter, a spurious echo signal from a receiving signal;
generating an echo cancellation signal based on said receiving signal including a voice signal of a speaker and the spurious echo signal;
generating an error signal based on an input signal and said echo cancellation signal.

6. An echo cancelling method according to claim 5, wherein
said generating said error signal includes:
generating a residual echo cancellation signal by removing a difference between said echo signal and said spurious echo signal from said echo cancellation signal;
generating the spurious voice signal based on the residual echo cancellation signal; and
generating the error signal by subtracting the spurious voice signal from said echo cancellation signal.

7. An echo canceller, comprising:
an adaptive filter which generates a spurious echo signal from a receiving signal;
a subtractor which generates an echo cancellation signal based on said receiving signal including a voice signal of a speaker and the spurious echo signal; and
an error signal generating circuit which delivers an error signal based on an input signal and said echo cancellation signal by removing a difference between said echo signal and said spurious echo signal from said echo cancellation signal.

8. An echo canceller according to claim 7, wherein said adaptive filter updates a characteristic of the adaptive filter such that an amplitude of said error signal becomes small.

9. An echo canceller according to claim 7, wherein the error signal generating circuit generates the error signal by removing the spurious echo signal from an echo signal.

10. An echo canceller according to claim 7, wherein the error signal is unaffected by the voice signal of the speaker.

11. An echo cancelling device according to claim 1, wherein the error signal generating circuit generates the error signal by removing the spurious echo signal from an echo signal.

12. An echo cancelling device according to claim 1, wherein the adaptive filter updates a characteristic of the adaptive filter such that an amplitude of said error signal becomes smaller.

13. An echo cancelling device according to claim 1, wherein the error signal is unaffected by the voice signal of the speaker.

14. A communication device according to claim 3, wherein the error signal generating circuit generates the error signal by removing the spurious echo signal from an echo signal.

15. A communication device according to claim 3, wherein the adaptive filter updates a characteristic of the adaptive filter such that an amplitude of said error signal becomes smaller.

16. A communication device according to claim 3, wherein the error signal is unaffected by the voice signal of the speaker.

17. An echo cancelling method according to claim 5, wherein the generating the error signal comprises removing the spurious echo signal from an echo signal.

18. An echo cancelling method according to claim 5, wherein the adaptive filter updates a characteristic of the adaptive filter such that an amplitude of said error signal becomes smaller.

19. An echo cancelling method according to claim 5, wherein the error signal is unaffected by the voice signal of the speaker.

* * * * *